United States Patent Office 2,858,302
Patented Oct. 28, 1958

2,858,302

POLYAZO DYESTUFFS AND THE METAL COMPLEX COMPOUNDS

Ernst Iselin, Dornach, and Walter Wehrli, Riehen, Switzerland, assignors, by mesne assignments, to Saul & Co., Newark, N. J., as nominee of Fidelity Union Trust Company, executive trustee under Sandoz Trust No Drawing. Application July 15, 1955
Serial No. 522,376

Claims priority, application Switzerland July 16, 1954

6 Claims. (Cl. 260—145)

The present invention relates to polyazo dyestuffs and to metal complex compounds thereof.

The polyazo dyestuffs of the present invention can be obtained by coupling (a) one mole of the diazo compound of an aminodisazo dyestuff which corresponds to the formula

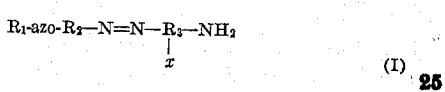

wherein each of $R_1$, $R_2$ and $R_3$ is a radical of the benzene or napthalene series which may bear further substituents such as are usual in azo dyestuffs, and $x$ is a methoxy or ethoxy group, and wherein -azo- and $-NH_2$ are in para-position to $-N=N-$, and $x$ is in ortho-position to $-NH_2$, with (b) one mole of an aminoazo compound which corresponds to the formula

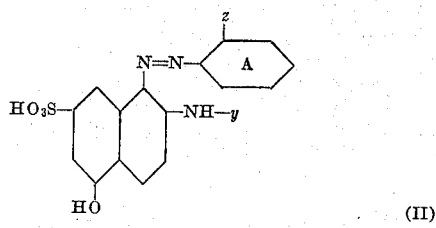

or with a metal complex compound thereof, wherein $y$ represents an alkyl, cycloalkyl, aralkyl or aryl group, which may be further substituted, and $z$ represents an hydroxy or carboxylic acid group, and wherein the nucleus A may bear additional substituents such as are usual in azo dyestuffs. The metal complex compounds of the present invention can be obtained by treating the thus-prepared polyazo dyestuffs in substance or on the fiber with a metal-yielding agent.

The new polyazo dyestuffs of the present invention correspond, in the metal-free state, to the formula

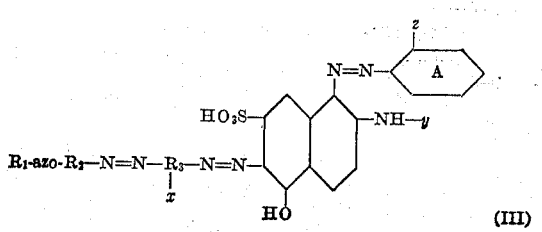

wherein $x$, $y$, $z$, $R_1$, $R_2$, $R_3$ and A have the afore-recited significances. These new dyestuffs are excellently suited for the dyeing of cotton and fibers of regenerated cellulose in gray shades. The dyeings obtained directly with the metal complex compounds or with the polyazo dyestuffs metallized on the fiber according to a single bath coppering process or an after-coppering process, are characterized by very good fastness to light and to washing.

As indicated, $R_1$, $R_2$ and $R_3$ as well as nucleus A may bear further substituents such as are usual in azo dyestuffs. Such substituents are, for example, halogen atoms (e. g. fluorine, chlorine, bromine), low molecular alkyl groups (e. g. methyl, ethyl), low molecular alkoxy groups (e. g. methoxy, ethoxy), acylamino groups (e. g. acetylamino, propionylamino, benzoylamino, carbomethoxyamino, carbethoxyamino), the hydroxyl group, the carboxylic acid group, the sulfonic acid group, sulfonic acid amide groups which may be substituted at the nitrogen atom (e. g. $-SO_2.NH_2$, $-SO_2.NH.CH_3$, $-SO_2.N(CH_3)_2$, $-SO_2.NH.C_2H_5$, $-SO_2NH.C_2H_4OH$, $-SO_2.NH.C_3H_6OCH_3$)

and low molecular alkylsulfonyl groups (e. g. $-SO_2.CH_3$)

The radical $y$ may, when it is an alkyl group, advantageously be substituted by an hydroxy or methoxy group, and when it is an aryl group, its substituents may also comprise the amino group or an aryl radical; thus for example, the (2'-hydroxy)-ethyl-, the (3'-methoxy)-propyl-, the (4'-amino)-phenyl- and the (4''-amino)-1',1''-diphenyl-radicals are excellently suitable to occupy the position of the symbol $y$ in Formulas II and III.

It is essential that the radicals $R_1$, $R_2$, $R_3$ and $y$ and nucleus A together contain the number of water-solubilizing groups necessary to impart water-solubility to the final products.

The aminodisazo dyestuffs of Formula I, which serve for the preparation of the diazo compounds, can be obtained in per se known manner, for example by diazotizing the initial component $R_1-NH_2$, wherein $R_1$ has the precedingly-recited significance, coupling the resultant diazo compound in weakly acid medium with a middle component $R_2-NH_2$, wherein $R_2$ also has the previously-recited significance, further diazotizing the obtained amino-monoazo compound and coupling the resultant diazo compound in weakly acid medium with component $x$-$R_3-NH_2$ wherein $R_3$ and $x$ have the previously-recited significances.

The aminoazo compounds of Formula II are obtained by the coupling, in acid medium, of diasotized 2-amino-1-hydroxybenzenes and 2-aminobenzene-1-carboxylic acids with the 2-amino-5-hydroxynaphthalene-7-sulfonic acids substituted at the nitrogen atom. By metallization of the thus-obtained coupling products there are obtained the corresponding metal complex compounds.

The diazo compounds of the aminodisazo dyestuffs I are coupled with the aminoazo compounds II or the corresponding metal complex compounds in alkaline medium, advantageously in a solution which is alkaline with ammonia or with bicarbonate and in the presence of a compound which has an accelerating action on the coupling reaction, for example, a tertiary organic base such as pyridine, quinoline, or a technical pyridine base mixture. The thus-prepared polyazo dyestuffs can be precipitated from the coupling mass by the addition of acid or by the addition of sodium chloride. The precipitates can, after filtration, be advantageously purified by re-dissolution in water, salting out and again filtering off. The so-obtained polyazo dyestuffs, which correspond to Formula III, supra, are well soluble in water and yield a specific solution coloration in sulfuric acid.

Conversion of the metal-free polyazo dyestuffs or the polyazo dyestuffs containing 1 metal atom into their complex compounds containing 2 metal atoms can be effected according to per se known metallizing processes, advantageously by heating the dyestuffs in aqueous solution or suspension with a metal-yielding agent in the presence of alkali salts of low molecular aliphatic monocarboxylic acids or by heating the aqueous dyestuff solutions with complex metal salt solutions. The metallization must be carried out under conditions which assure the splitting of the alkoxy group $x$. The metal involved in the metallization is preferably copper.

and is a dark powder which dissolves in water to yield a reddish blue coloration and in concentrated sulfuric acid to yield a gray-blue coloration, and dyes cotton and fibers of regenerated cellulose by a single bath or two-bath coppering process in pretty gray-blue shades of very good fastness to light and to washing.

To convert the tetrakisazo dyestuff into the copper complex compound, the moist filter paste is dissolved in 1500 parts of water at 90°. There is then added to the solution a mixture of 50 parts of crystalline copper sulfate, 200 parts of water and 90 parts of concentrated aqueous ammonia solution and then the entire mixture is boiled under reflux until the methoxy group has been split. This operation requires about 6 to 12 hours. The resultant copper-containing tetrakisazo dyestuff is salted out, filtered off and dried. It corresponds to the formula

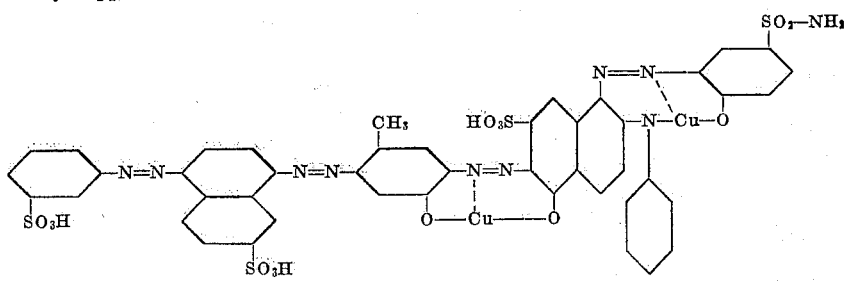

The following examples set forth representative embodiments of the invention, but are not at all intended to be limitative of the latter. In such examples, the parts and percentages are by weight and the temperatures are in degrees centigrade.

Example 1

55.5 parts of the aminodisazo compound—obtained by coupling diazotized 1-aminobenzene-3-sulfonic acid with 1-aminonaphthalene-7-sulfonic acid, further diazotizing the aminomonoazo compound, and coupling the resultant diazo compound with 2-amino-1-methoxy-4-methylbenzene—are stirred into 500 parts of water. 7 parts of sodium nitrite are added to the resultant suspension which is then rendered acid to Congo red by the addition of 50 parts of concentrated hydrochloric acid at 5–10° while stirring thoroughly. At the end of 2 or 3 hours, the diazotization is over. The obtained diazo suspension is then added, with ice cooling, to a solution of 51.6 parts of the monoazo compound obtained by the acid coupling of diazotized 2-amino-1-hydroxybenzene-4-sulfonic acid amide with 2-phenylamino-5-hydroxynaphthalene-7-sulfonic acid, 400 parts of water, 400 parts of pyridine and 25 parts of concentrated aqueous ammonia. Coupling to the tetrakisazo dyestuff ensues forthwith; it is over in a short time. The coupling mass is then rendered weakly acid with concentrated hydrochloric acid and the dyestuff which precipitates is filtered off. The obtained filter cake is stirred into 1000 parts of water and the obtained suspension is rendered weakly alkaline by the addition of aqueous caustic soda solution, whereupon the dyestuff dissolves. It is then salted out, filtered off and dried. The so-obtained new tetrakisazo dyestuff corresponds to the formula and is a dark powder which dissolves in water and in concentrated sulfuric acid to yield a gray-blue coloration, and dyes cotton and fibers of regenerated cellulose in gray shades of very good fastness to light and to washing.

Example 2

65.4 parts of the aminodisazo compound—obtained by coupling diazotized 1-amino-4-hydroxybenzene-3-carboxylic acid with 1-aminonaphthalene-7-sulfonic acid, further diazotizing the aminomonoazo compound and coupling the so-obtained diazo compound with 1-amino-2-methoxynaphthalene-6-sulfonic acid—are stirred at 60° into 500 parts of water. 7 parts of sodium nitrate are then added to the resultant solution which is thereupon cooled to 10–15° and poured into a mixture of 50 parts of concentrated hydrochloric acid and 200 parts of ice. The reaction mass is stirred for 2 to 4 hours, while cooling with ice. Upon conclusion of the diazotization, the precipitated diazo compound is filtered off and is then introduced, in the form of concentrated moist paste, into an ice-cooled solution of 51.4 parts of the monoazo compound obtained by acid coupling of diazotized 2-amino-1-hydroxybenzene-4-sulfonic acid amide with 2-phenylamino-5-hydroxynaphthalene-7-sulfonic acid, 400 parts of water, 600 parts of pyridine and 25 parts of sodium bicarbonate. Coupling to the tetrakisazo dyestuff ensues forthwith. The coupling is finished at the end of 4 hours. The coupling mass is then rendered weakly acid to Congo red by the addition of hydrochloric acid, the precipitated dyestuff is filtered off and the filter cake is again stirred into 1000 parts of water. The resultant suspension is rendered weakly alkaline by means of aqueous caustic soda solution, whereupon the thus-redis-

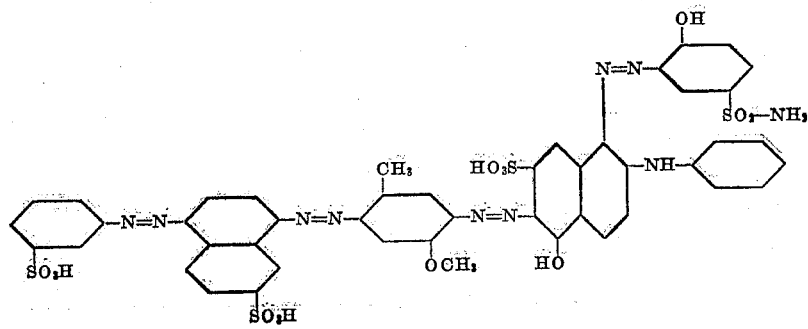

solved dyestuff is again salted out, filtered off and dried. It corresponds to the formula and which yields dyeings of very good fastness to light and washing on cotton and fibers of regenerated cellulose,

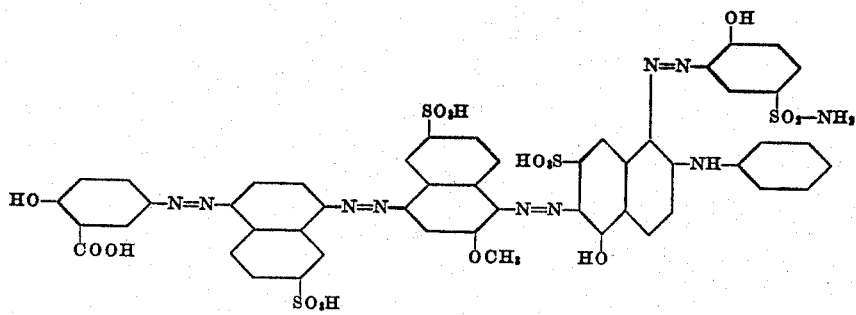

and is a black powder which dissolves in water to yield a blue-green coloration and in concentrated sulfuric acid to yield a blue-gray coloration and dyes cotton and fibers of regenerated cellulose by an after-coppering process in neutral gray shades of very good fastness to light and to washing.

Conversion of the dyestuff into the copper complex compound is effected by dissolving the moist filter paste in 1750 parts of water at 90° with the addition of 20 parts of sodium carbonate, coppering the dissolved dyestuff after the manner described in the preceding example, and then working up the product as there set forth. The copper containing tetrakisazo dyestuff thus prepared corresponds to the formula both as the after-coppering dyestuff and as the copper complex compound.

Example 4

60.5 parts of the aminodisazo compound—obtained by coupling diazotized 2-aminonaphthalene-4,8-disulfonic acid with 1-aminonaphthalene, further diazotizing the aminomonoazo compound and coupling the so-obtained diazo compound with 2-amino-1-methoxy-4-methylbenzene—are stirred into 1000 parts of water. 7 parts of sodium nitrite are added to the resultant suspension which is then introduced into a mixture of 25 parts of concen-

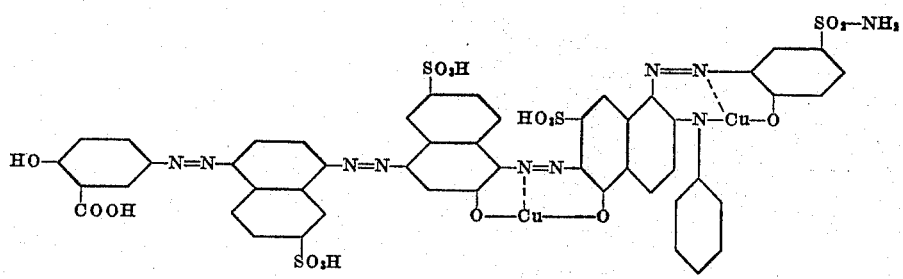

and is a dark powder which dissolves in water and in concentrated sulfuric acid to yield a gray coloration and dyes cotton and fibers of regenerated cellulose in neutral gray shades of high fastness to light and to washing.

Example 3

Upon replacing the 51.4 parts of the monoazo compound used in the preceding example by 51.3 parts of the monoazo compound prepared by the acid coupling of diazotized 2-amino-1-hydroxy-4-methylsulfonylbenzene with 2-phenylamino-5-hydroxynaphthalene-7-sulfonic acid, a similar tetrakisazo dyestuff is obtained which corresponds to the formula trated hydrochloric acid and 250 parts of ice. The resultant reaction mass is stirred for 2 to 3 hours at 0–5°, at the end of which time the diazotization is finfiished. The resultant diazo compound is then introduced, while cooling with ice, into a solution of 54.6 parts of the monoazo compound obtained by the acid coupling of diazotized 2-amino-1-hydroxybenzene-4-sulfonic acid amide with 2-(4'-methoxy)-phenylamino-5-hydroxynaphthalene-7-sulfonic acid, 50 parts of sodium bicarbonate, 600 parts of water and 600 parts of pyridine. Upon completion of the coupling, the coupling mass is heated to 60–80°.

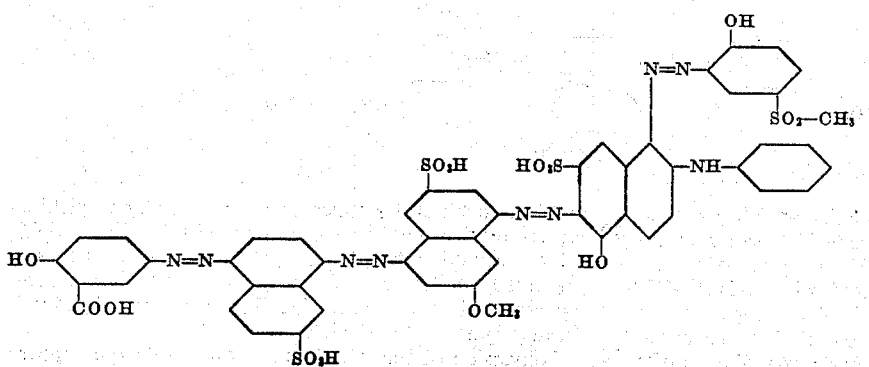

The resultant tetrakisazo dyestuff which corresponds to the formula

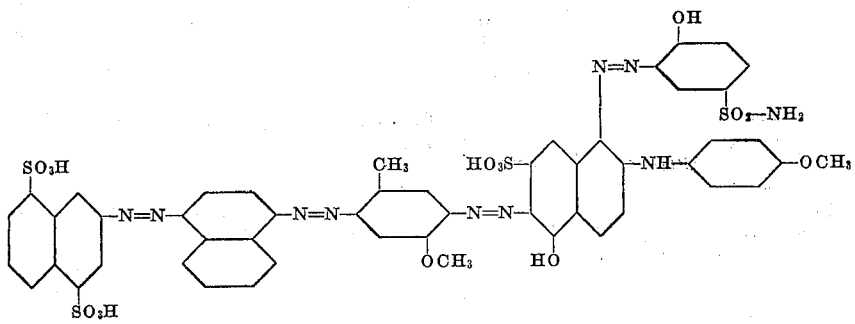

is precipitated by the addition of sodium chloride, and is then filtered off and dried. It is a black powder which dissolves in water to yield a blue coloration and in concentrated sulfuric acid to yield a blue-gray coloration, and dyes cotton and fibers of regenerated cellulose by an after-coppering process in neutral gray shades of very good fastness to light and to washing.

In order to convert the said tetrakisazo dyestuff into the copper complex compound, the moist filter paste is dissolved in 2000 parts of water at 85–90° with addition of 30 parts of sodium carbonate, and is then coppered after the manner set forth in Example 1. The obtained copper-containing tetrakisazo dyestuff corresponds to the formula

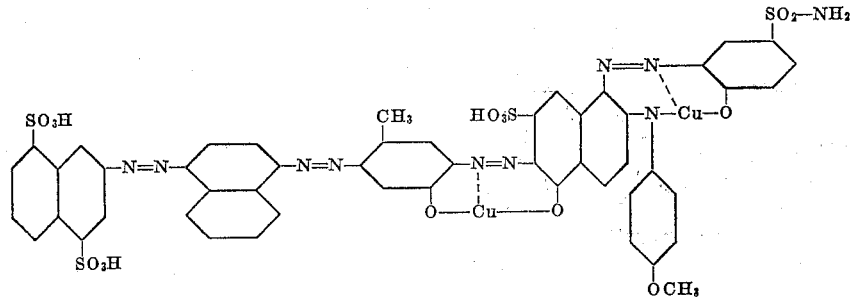

and is a dark powder which dissolves in water and in concentrated sulfuric acid to yield a gray coloration and dyes cotton and fibers of regenerated cellulose in neutral gray shades of high fastness to light and to washing.

Example 5

62.1 parts of the aminodisazo compound—obtained by coupling diazotized 1-aminonaphthalene-5-sulfonic acid with 1-aminonaphthalene-7-sulfonic acid, further diazotizing the obtained aminomonoazo compound and coupling the resultant diazo compound with 2-amino-1,4-dimethoxybenzene—are dissolved in 900 parts of water at 60° with the addition of 50 parts of concentrated aqueous caustic soda solution. 7 parts of sodium nitrite and 100 parts of sodium chloride are then added, and the reaction mass is cooled to 5 to 10° by the addition of ice.

The resultant suspension is then run into a mixture of 75 parts of concentrated hydrochloric acid, 200 parts of ice and 200 parts of water. The mass is stirred at 0–5° until the diazotization which ensues is ended, which will be the case after about 4 to 8 hours. The precipitated diazo compound is then filtered off and is introduced, in the form of concentrated paste, into an ice-cold solution of 54.6 parts of the monoazo compound obtained by acid coupling of diazotized 2-amino-1-hydroxybenzene-4-sulfonic acid amide with 2-phenylamino-5-hydroxynaphthalene-7-sulfonic acid, 400 parts of water, 400 parts of technical pyridine base mixture and 50 parts of concentrated aqueous ammonia solution. The ensuing coupling to the tetrakisazo dyestuff is concluded in a short time; the dyestuff solution is acidified with concentrated hydrochloric acid to separate the pyridine bases, after which the dyestuff is filtered off, recrystallized once or twice from dilute aqueous caustic soda solution and finally salted out of solution, filtered off and dried. The obtained tetrakisazo dyestuff corresponds to the formula

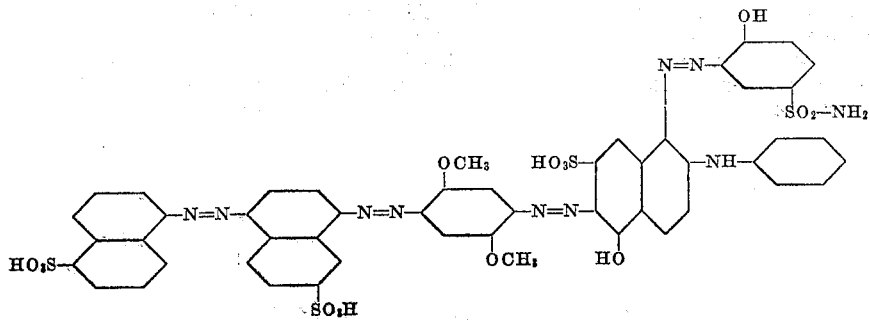

and is a dark powder which dissolves in water to yield a blue coloration and in concentrated sulfuric acid to yield a blue-gray coloration, and dyes cotton and fibers of regenerated cellulose by a single bath or a two-bath coppering process in pretty gray-blue shades of very high fastness to light and to washing.

Conversion of the tetrakisazo dyestuff into the copper complex compound takes place after the manner described in Example 1. The resultant copper-containing tetrakisazo dyestuff corresponds to the formula

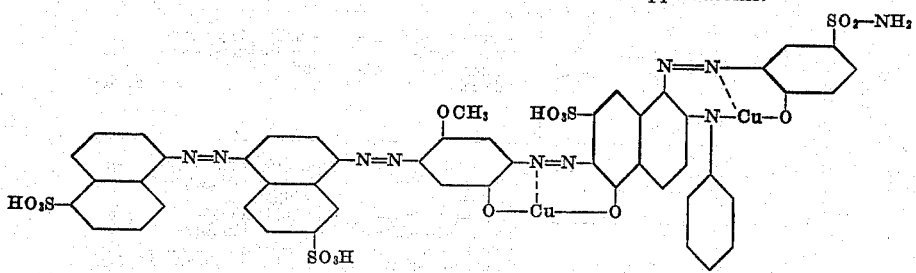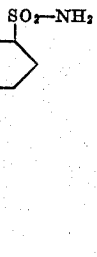

and is a dark powder which dissolves in water and in concentrated sulfuric acid with gray coloration, and dyes cotton and fibers of regenerated cellulose in neutral gray shades of outstanding fastness to light and to washing.

*Example 6*

By replacing the 54.6 parts of the monoazo compound employed in the preceding example by 57.7 parts of the coppered monoazo compound prepared by the acid coupling of diazotized 2-amino-1-hydroxybenzene-4-sulfonic acid with 2-phenylamino-5-hydroxynaphthalene-7-sulfonic acid, a tetrakisazo dyestuff which corresponds to the formula

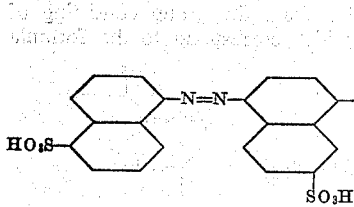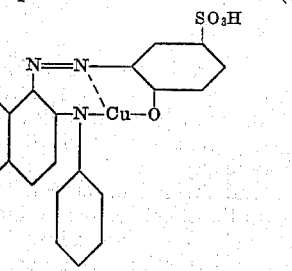

is obtained. This dyestuff yields gray dyeings of very high fastness to light and to washing on cotton and fibers of regenerated cellulose, by an after-coppering process or also in the form of the copper compound containing 2 copper atoms.

The following table sets forth additional polyazo dyestuffs which can be prepared after the manner of the foregoing examples. These polyazo dyestuffs all correspond in the metal-free form to the Formula III. Column 2 of the table sets forth the aminobenzenes and aminonaphthalenes from which the diazo components $R_1$ are prepared, columns 3 and 4 set forth the aminobenzenes and aminonaphthalenes corresponding to the middle components $R_2$ and $x$-$R_3$, and column 5 sets forth the end components obtained by acid coupling of a diazotized 2-amino-1-hydroxybenzene or a diazotized 2-aminobenzene-1-carboxylic acid (*a*) with a 2-amino-5-hydroxynaphthalene-7-sulfonic acid (*b*), or the copper complex compounds thereof. Column 6, finally, indicates the shade of the coppered dyeings on cotton.

| (1) Example No. | (2) Diazo Components (corresponding to $R_1$) | (3) Middle Components (corresponding to $R_2$) | (4) Middle Components (corresponding to $R_3$) $x$ | (5) 2-amino-1-hydroxybenzene or 2-aminobenzene-1-carboxylic acid (*a*) | (5) 2-amino-5-hydroxynaphthalene-7-sulfonic acid (*b*) | (6) Dyeing on cotton |
|---|---|---|---|---|---|---|
| 7 | 1-amino-4-hydroxybenzene-3-carboxylic acid. | 1-aminonaphthalene-6-sulfonic acid. | 2-amino-1-methoxy-4-methylbenzene. | 1-amino-2-hydroxy-3-carboxybenzene-5-sulfonic acid. | 2-(4'-chloro)-phenylamino-5-hydroxynaphthalene-7-sulfonic acid. | gray. |
| 8 | 1-amino-4-hydroxy-3-carboxybenzene-5-sulfonic acid. | 1-aminonaphthalene-7-sulfonic acid. | 2-amino-1-methoxy-4-ethoxybenzene. | 2-amino-1-hydroxybenzene-4-sulfonic acid-methylamide. | 2-phenylamino-5-hydroxynaphthalene-7-sulfonic acid. | Do. |
| 9 | ----do---- | 1-aminonaphthalene. | 2-amino-1-methoxy-4-methylbenzene. | 2-amino-1-hydroxybenzene-4-sulfonic acid-(2'-hydroxy)-ethylamide. | 2-(4'-carboxy)-phenylamino-5-hydroxynaphthalene-7-sulfonic acid. | Do. |
| 10 | 1-amino-2-hydroxy-3-carboxybenzene-5-sulfonic acid. | 1-aminonaphthalene-6-sulfonic acid. | ----do---- | 2-amino-1-hydroxy-4-methylsulfonylbenzene. | 2-phenylamino-5-hydroxynaphthalene-7-sulfonic acid. | Do. |
| 11 | ----do---- | ----do---- | ----do---- | 2-amino-1-hydroxy-4-nitrobenzene. | 2-(3'-carboxy)-phenylamino-5-hydroxynaphthalene-7-sulfonic acid. | Do. |
| 12 | 1-aminobenzene-4-sulfonic acid. | ----do---- | ----do---- | 2-amino-1-hydroxy-4-chlorobenzene. | 2-(4'-methyl)-phenylamino-5-hydroxynaphthalene-7,3'-disulfonic acid. | |
| 13 | 2-aminonaphthalene-6,8-disulfonic acid. | 1-amino-3-methylbenzene. | ----do---- | 2-amino-1-hydroxy-4-chloro-6-nitrobenzene. | 2-phenylamino-5-hydroxynaphthalene-7,4'-disulfonic acid. | Do. |
| 14 | 1-aminonaphthalene-4-sulfonic acid. | 1-aminonaphthalene-7-sulfonic acid. | ----do---- | 2-amino-1-hydroxybenzene-5-sulfonic acid. | 2-phenylamino-5-hydroxynaphthalene-7-sulfonic acid. | Do. |
| 15 | 1-aminonaphthalene-8-sulfonic acid. | 1-aminonaphthalene-6-sulfonic acid. | 2-amino-1,4-diethoxybenzene. | 2-amino-1-hydroxybenzene-4-sulfonic acid-(3'-methoxy)-propylamide. | ----do---- | Do. |
| 16 | 1-aminonaphthalene-3,8-disulfonic acid. | 1-aminonaphthalene. | 1-amino-2-ethoxynaphthalene-6-sulfonic acid. | 2-amino-1-hydroxybenzene-4-sulfonic acid-cyclohexylamide. | ----do---- | Do. |
| 17 | 2-aminonaphthalene-3,6-disulfonic acid. | ----do---- | 2-amino-1,4-dimethoxybenzene. | 2-amino-1-hydroxybenzene-4-sulfonic acid-phenylamide. | ----do---- | Do. |

| (1) Example No. | (2) Diazo Components (corresponding to $R_1$) | (3) Middle Components (corresponding to $R_2$) | (4) Middle Components (corresponding to $R_3$) $x$ | (5) 2-amino-1-hydroxy-benzene or 2-amino-benzene-1-carboxylic acid (a) | (5) 2-amino-5-hydroxy-naphthalene-7-sulfonic acid (b) | (6) Dyeing on cotton |
|---|---|---|---|---|---|---|
| 18 | 2-aminonaphthalene-5,7-disulfonic acid. | 1-aminonaphthalene | 2-amino-1-methoxy-4-methylbenzene. | 2-amino-1-hydroxy-benzene-4-sulfonic acid-benzylamide. | 2-phenylamino-5-hydroxynaphthalene-7-sulfonic acid. | Do. |
| 19 | 2-aminonaphthalene-6,8-disulfonic acid. | ----do---- | ----do---- | 2-amino-1-hydroxy-benzene-4-sulfonic acid amide. | 2-methylamino-5-hydroxynaphthalene-7-sulfonic acid. | Do. |
| 20 | 1-aminobenzene-3-sulfonic acid. | 1-aminonaphthalene-6-sulfonic acid. | 1-amino-2-methoxynaphthalene-6-sulfonic acid. | 2-amino-1-hydroxy-benzene-5-sulfonic acid-ethylamide. | 2-cyclohexylamino-5-hydroxynaphthalene-7-sulfonic acid. | Do. |
| 21 | 1-amino-4-hydroxy-benzene-3-carboxylic acid. | ----do---- | ----do---- | ----do---- | 2-benzylamino-5-hydroxynaphthalene-7-sulfonic acid. | Do. |
| 22 | ----do---- | ----do---- | ----do---- | 2-amino-1-hydroxy-benzene-5-sulfonic acid-morpholide. | 2-phenylamino-5-hydroxynaphthalene-7-sulfonic acid. | Do. |
| 23 | 1-aminobenzene-3-sulfonic acid. | 1-aminonaphthalene-7-sulfonic acid. | 2-amino-1-methoxy-4-methylbenzene. | copper complex compound from (2-amino-1-hydroxybenzene-4-sulfonic acid amide (acid) → 2-phenylamino-5-hydroxynaphthalene-7-sulfonic acid). | | bluish gray. |
| 24 | 1-aminonaphthalene-5-sulfonic acid. | ----do---- | 2-amino-1,4-dimethoxybenzene. | copper complex compound from (2-amino-1-hydroxy-4-methyl-sulfonylbenzene (acid)→2-phenylamino-5-hydroxynaphthalene-7-sulfonic acid). | | Do. |

*Example 25*

100 parts of cotton are wetted in a dyebath containing 3000 parts of lime-free water at 50°. A concentrated aqueous solution of 1 part of the tetrakisazo dyestuff obtained according to Example 1, paragraph 1, is then added to the bath, which is thereupon heated to boiling in the course of 30 minutes and maintained at boiling temperature for 15 minutes. In the course of the dyeing process, 20 to 40 parts of Glauber's salt are added in the form of a concentrated aqueous solution. Upon conclusion of the dyeing process, the dyed material is allowed to cool to 50° in the bath in the course of 15 to 20 minutes, after which it is rinsed and subjected to an aftertreatment with copper sulfate or with a cation-active copper complex compound which preferably is basic.

*Example 26*

1 part of the copper-containing tetrakisazo duestuff obtained according to Example 1, paragraph 2, is dissolved in 3000 parts of hot water. 100 parts of cotton skein or cotton material are entered into the resultant gray-blue colored dyebath at 50°, and then the bath is heated to 95–100° in the course of 30 minutes and the dyeing continued for 30 more minutes at approximately boiling temperature. In the course of the dyeing process, 20 to 40 parts of Glauber's salt are added little by little. After cooling to about 50°, the dyed material is withdrawn from the bath, rinsed with cold water and dried. There is obtained a gray dye with excellent fastness to washing and to light.

An aftertreatment of the dyeing with copper salts, particularly in combination with cation-active compounds, may result in further improvement of the fastness properties.

Having thus disclosed the invention what is claimed is:

1. A member selected from the group consisting of the polyazo dyestuffs which correspond to the formula

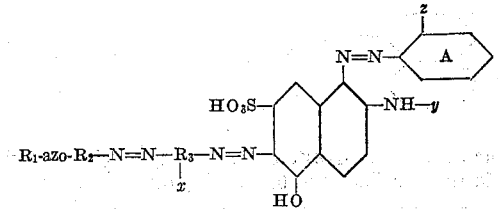

and the complex copper compounds thereof, wherein each of $R_1$, $R_2$ and $R_3$ is a radical selected from the group consisting of radicals of the benzene and naphthalene series, $x$ is an alkoxy group with 1 to 2 carbon atoms, $y$ represents a member selected from the group consisting of lower alkyl, cyclohexyl, benzyl and mononuclear aryl, $z$ is a member selected from the group consisting of —OH and —COOH, and the nucleus A contains at least one substituent selected from the group consisting of —Cl, —NO$_2$, —COOH, —SO$_3$H, —SO$_2$CH$_3$, —SO$_2$NH$_2$, —SO$_2$NH.lower alkyl, —SO$_2$NH.lower alkoxyalkyl, SO$_2$NH.lower hydroxyalkyl, —SO$_2$NH.mononuclear aryl, —SO$_2$NH.benzyl and —SO$_2$-morpholine radicals, and wherein -azo- and the adjacent —N=N— are in para-position with respect to each other, the —N=N— groups attached to $R_3$ are in para-position with respect to each other, and $x$ is ortho-positioned with respect to the —N=N— group bridging $R_3$ and the adjacent naphthalene nucleus.

2. The polyazo dyestuff which corresponds to the formula

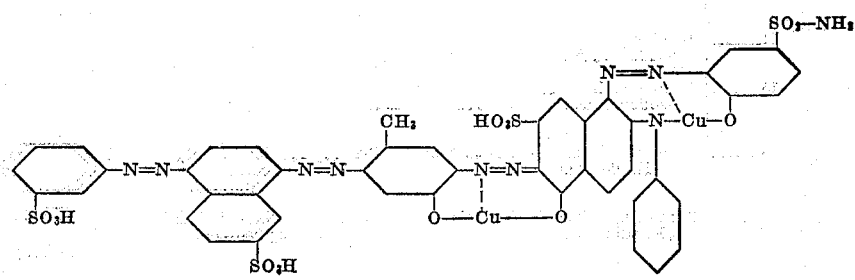

3. The polyazo dyestuff which corresponds to the formula
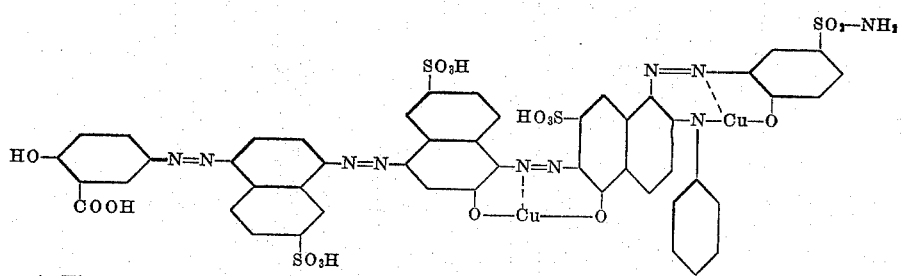
4. The polyazo dyestuff which corresponds to the formula
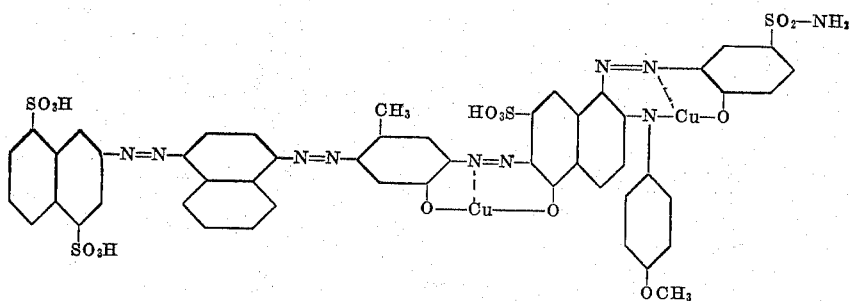
5. The polyazo dyestuff which corresponds to the formula
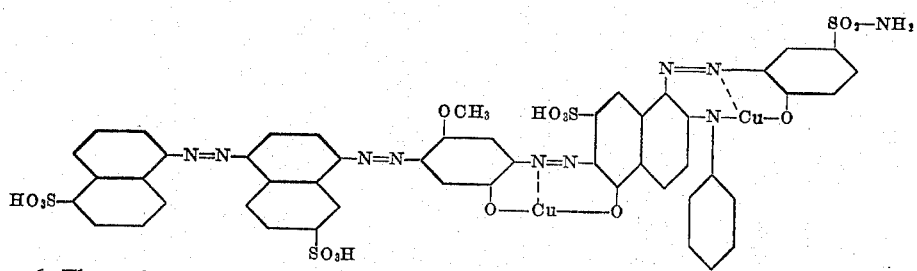
6. The polyazo dyestuff which corresponds to the formula
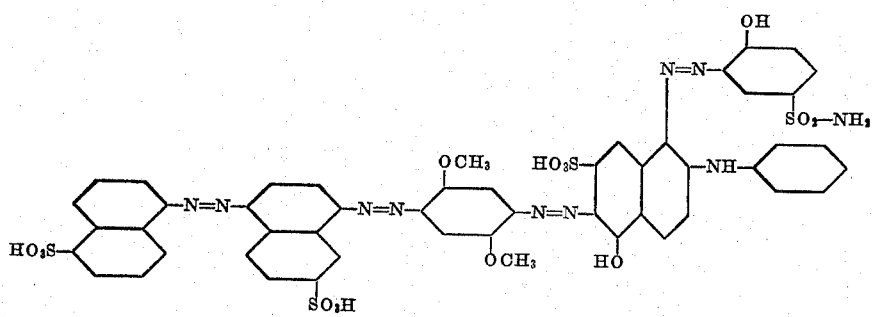
References Cited in the file of this patent
UNITED STATES PATENTS
| | | |
|---|---|---|
| 2,270,675 | Stein et al. | Jan. 20, 1942 |
| 2,459,913 | Bossard | Jan. 25, 1949 |
FOREIGN PATENTS
| | | |
|---|---|---|
| 639,866 | Great Britain | July 5, 1950 |